United States Patent [19]

Coquillart

[11] 4,437,030
[45] Mar. 13, 1984

[54] ROTOR WITH A COOLING DEVICE, MORE PARTICULARLY OF THE COMMUTATOR, FOR ELECTRIC MOTORS, AND THE METHOD AND MEANS FOR MAKING THIS DEVICE

[75] Inventor: Michel Coquillart, Saint.Etienne Terrenoire, France

[73] Assignee: Mavilor Systemes, Switzerland

[21] Appl. No.: 260,996

[22] Filed: May 6, 1981

[30] Foreign Application Priority Data

May 9, 1980 [FR] France ................. 80 11149

[51] Int. Cl.³ ............................................. H02K 9/28
[52] U.S. Cl. ..................................... 310/227; 310/64;
165/104.25
[58] Field of Search ........................ 310/42, 52, 53, 54,
310/57, 58, 59, 60 R, 61, 64, 65, 43, 45, 227,
237, 261, 268; 165/104.25

[56] References Cited

U.S. PATENT DOCUMENTS

| | | | |
|---|---|---|---|
| 3,189,769 | 6/1965 | Willyoung | 310/64 |
| 3,277,323 | 10/1966 | Parker | 310/61 |
| 3,997,806 | 12/1976 | Noto | 310/43 |
| 4,020,372 | 4/1977 | Whiteley | 310/268 |
| 4,137,472 | 1/1979 | Workman | 310/61 |
| 4,190,780 | 2/1980 | Whiteley | 310/64 |
| 4,240,000 | 12/1980 | Harano | 310/64 |

FOREIGN PATENT DOCUMENTS 1922427 11/1970 Fed. Rep. of Germany ........ 310/64

Primary Examiner—R. Skudy
Attorney, Agent, or Firm—Eric P. Schellin

[57] ABSTRACT

A rotor having a thermal bridge embedded in the rotor for transferring heat released by the commutator of the rotor to the inner bushing of the drive shaft of the electric motor thereby cooling the rotor. The bridge may either be formed of a solid metal piece or a fluid containing conduits; both of which are electrically insulated from the commutator. Orifices are formed in the thermal bridge so that both halfs of the resin molded commutator can be joined together and form a stronger rotor.

7 Claims, 10 Drawing Figures

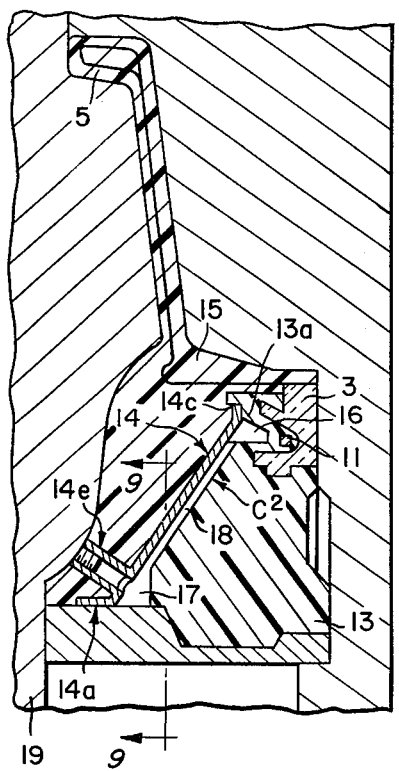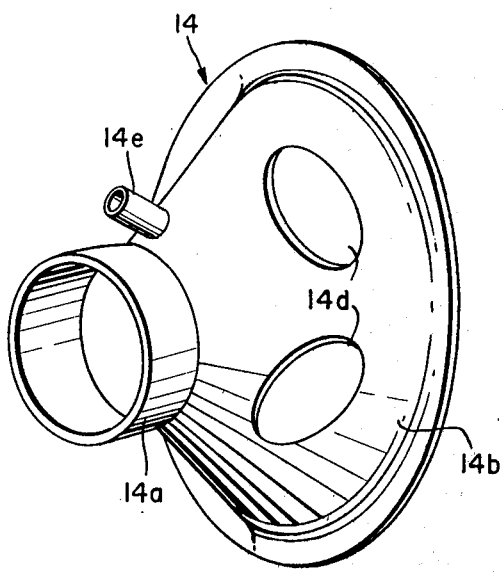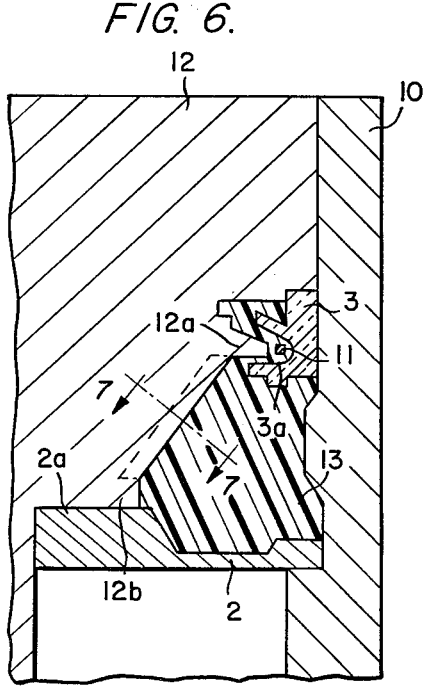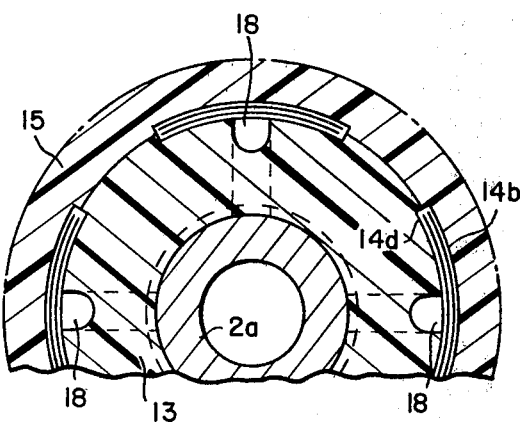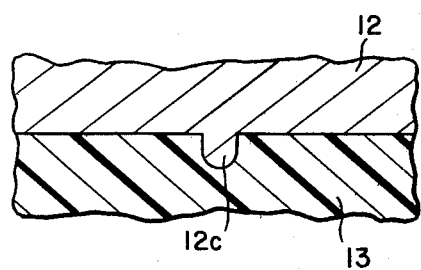

ROTOR WITH A COOLING DEVICE, MORE PARTICULARLY OF THE COMMUTATOR, FOR ELECTRIC MOTORS, AND THE METHOD AND MEANS FOR MAKING THIS DEVICE

BACKGROUND OF THE INVENTION

The invention has for its object a rotor with a cooling device, more particularly of the commutator, for electric motors, and the method and means for making this device.

The object of the invention belongs more particularly to the technical field of the electric motors with flat or disk-shaped commutators.

SUMMARY OF THE INVENTION

In accordance with the invention, the cooling of the rotor and of the commutator of an electric motor is provided by transferring calories of heat released by the commutator toward the outside of the motor through the conductive socket of the rotor, by means of a simple device integrated to the manufacture of the rotor.

According to a first characteristic, the calories of heat are transferred from the commutator to the socket of the rotor through a thermal bridge established between the conductive inner socket and the commutator by one or more solid or fluid conducting means which are imbedded or included during the molding operation, a portion of which being positioned immediately adjacent to the commutator, however without any contact with said commutator, the other portion being in close contact with the conductive socket.

These and other characteristics will be apparent from the following description.

The object of the invention will be understood more fully with reference to the attached drawings, without however being restricted thereby. In the drawings:

BRIEF DESCRIPTION OF THE DRAWINGS

FIG. 6 is a partial sectional view illustrating the first part of the molding of a rotor with a heat transfer element directly formed with the molding.

FIG. 7 is a partial sectional view along line 7—7 of FIG. 6.

FIG. 8 is a partial sectional view illustrating the second part of the molding of the rotor according to FIG. 6.

FIG. 9 is a partial sectional view along line 9—9 of FIG. 8.

FIG. 10 is a perspective view illustrating a portion of the heat transfer element according to FIGS. 6 to 9.

DETAILED DESCRIPTION OF THE PREFERRED EMBODIMENTS

In order to make the object of the invention more readily apparent, this object will be described now with reference to the forms of embodiment illustrated in the Figures of the drawings without being restricted thereby.

Figure 1:
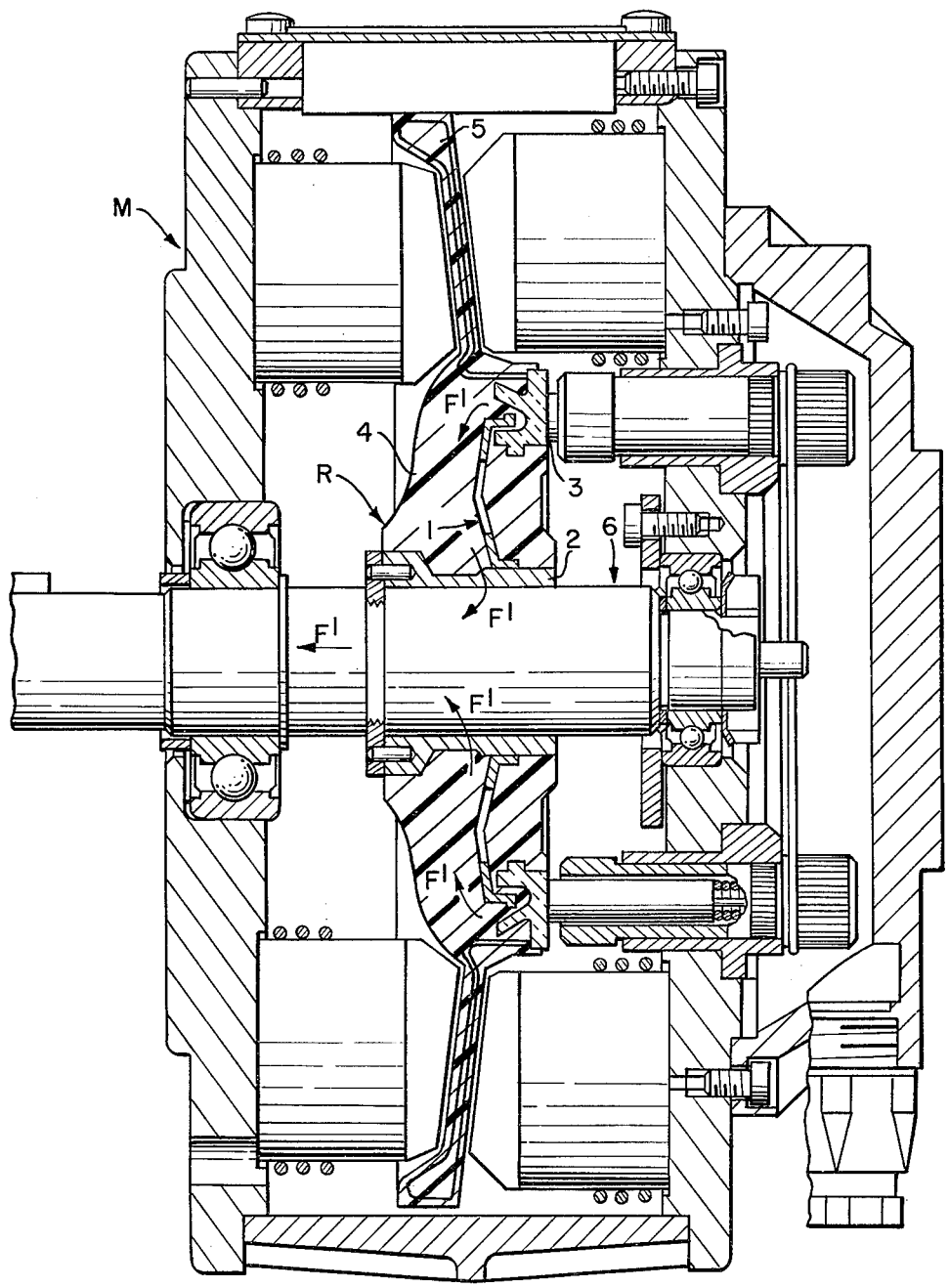
FIG. 1 is a sectional view illustrating an electric motor equipped with a rotor in a form of embodiment in accordance with the invention.

There will be seen in FIG. 1 an example of embodiment of the electric motor M having a disk-shaped flat rotor R, including a molded unit incorporating a commutator, a socket, a plurality of windings and a cooling device in accordance with the invention and considered in one of the possible forms of embodiment.

Figure 2:
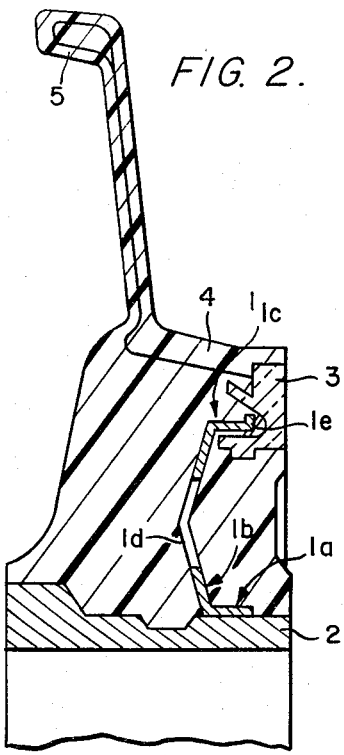
FIG. 2 is a partial sectional view of the rotor according to FIG. 1.
Figure 3:
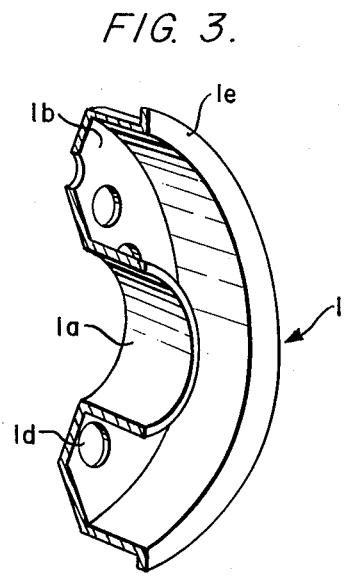
FIG. 3 is a partial perspective view of the calory transfer element according to FIGS. 1 and 2.

According to this first form of embodiment illustrated illustrated in FIG. 1, 2 and 3, the thermal bridge between the commutator and the socket of the rotor is obtained by means of a metal piece 1 which includes an inner bearing part 1a mounted clamped on a bearing part of the inner bushing 2 of the rotor, a wall 1b approximately normal to the bearing part 1a, and an outer bearing part 1c extending in the same direction as the bearing part 1a or differently, which is disposed immediately adjacent to the commutator 3 without however being in contact with this commutator. The piece 1 is positioned on inner bushing 2 before the molding of the unit and is embedded within the molded resin insulating piece 4 enclosing in a known manner the commutator 3 and the windings or coils 5. Previously, the insulating piece 4 has been insulated electrically immediately, more particularly adjacent to the commutator, by all the well-known means such as glass fiber or epoxy coating or the like.

To prevent cutting the molding in two distinct portions, and to ensure the continuity of the molded resin, the piece 1 has in the wall 1b thereof a plurality of openings 1d through which the resin can pass.

On the other hand, the outer cylindrical bearing part 1c has preferably at the end thereof an upturned edge 1e to enhance the stiffness of the piece 1 and to participate efficiently in the reinforcement of the commutator.

In such a form of embodiment, it will be readily understood that the calories of the heat released by the commutator 3 are captured by the metal piece 1 and transferred by conduction toward the inner bushing 2 of the rotor and the motor shaft 6 from which they are discharged to the outside of the motor (arrow f1, FIG. 1).

The transfer of the calories through thermal bridge can be substantially increased by substituting a device for transmitting heat for the metal piece 1.

This heat transmitting device, which is well known in the art, includes a first external space located toward a warm portion and a second internal space located toward a cold portion or a less warm portion. Between these two spaces, air tight connections permit the circulation of a liquid or gaseous fluid.

The heat transmitting device is filled in part with a fluid which will be capable of vaporizing when it will be in the hot space, and of liquefying when it will be in the cold or less warm space.

As the construction and the operation of the heat transmitting device are designed to cause the fluid in the liquid phase to be moved toward the hot space while expelling the fluid in the gaseous phase toward the cold or less warm space, the operation of the caloduc will be clearly understood.

In fact, the liquid phase at the hot space will pass into the gaseous phase by absorbing the calories of heat in the warm space which are necessary for this transformation (vaporization heat). The fluid in the gaseous form will be expelled toward the cold or less warm space where it will be enabled to condensate into liquid phase while giving up as many calories as it will have absorbed to vaporize. The fluid which has been returned into the liquid phase will be moved toward the hot space, and it will be possible for a further sequence to take place.

Figure 4:
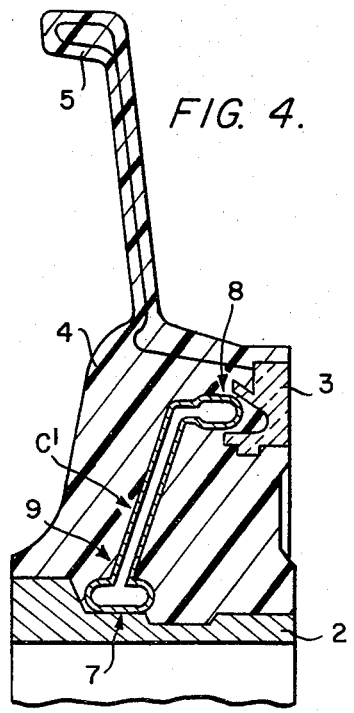
FIG. 4 is a partial sectional view of a rotor with a heat transfer element in accordance with a further form of embodiment.
Figure 5:
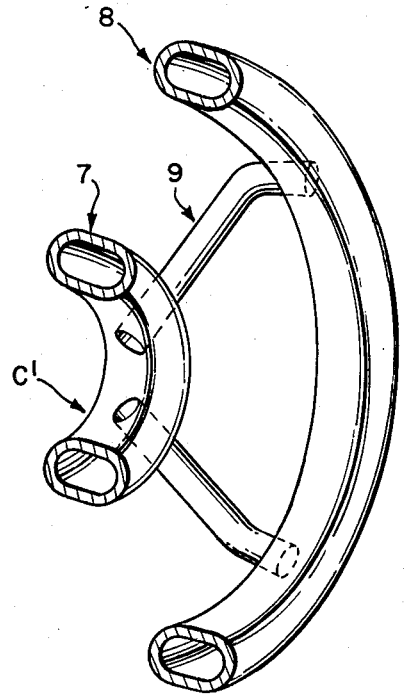
FIG. 5 is a partial perspective view of the heat transfer element according to FIG. 4.

FIG. 4 and 5 illustrate a first form of embodiment of this heat transmitting device $C^1$. The inner and outer conduits or annular tubulures 7 and 8 are formed by tubular metal tubes of any section, and they are for instance egg-shaped. The inner conduit 7 is in close contact with one of the bearing parts of the inner bushing 2 of the rotor, while the outer conduit 8 is disposed closely adjacent to the commutator 3, however without being in contact with the latter. The two conduits 7 and 8 are connected by radial tubular branches 9 for the internal communications, and the sealed unit is embedded within the resin at the time of the molding. This circuit is then partly filled, prior to closing it, with a fluid the vaporization temperature of which has been selected conveniently on the basis of the temperature reached by the commutator.

To prevent air being enclosed when filling, the fluid is partly vaporized with the aid of a heat source.

For example, should the rotor be operated between 30° and 80° C., the circuit is filled with a fluid vaporizing at 70/80° C. (more particularly toluene); the circuit is then warmed up to the temperature of 80° C. (alcohol boiling temperature), and the air is expelled thereby. There remains therefore the fluid only, which is partly liquid and partly gaseous, and it is possible to seal the circuit.

It will be noted that for other operational temperatures, the thermal exchange fluid will have to be adapted accordingly.

When the rotor thus equipped is placed in a motor and is rotated, the liquid fluid is moved by the centrifugal force toward the outer conduit 8, i.e. toward the commutator 3 or the warm space, while the gaseous fluid is forced back toward the inner conduit 7, i.e. toward the socket or cold (or less warm) space. As soon as the fluid vaporizing temperature is reached by the commutator, the thermal exchange sequence is initiated and the calories are transferred toward the inner bushing 2 and the motor shaft 6, and then outwardly.

In accordance with another form of embodiment illustrated in FIG. 6 to 10, the heat transmitting device (C2) is made directly within the resin by molding the rotor in two parts.

As may be seen in FIG. 6 and 7, the inner bushing 2 of the rotor and the commutator 3 are positioned in a lower mold 10, as well as a reinforcement ring 11 in the groove 3a of the commutator, as the case may be. An upper mold 12 is placed against the socket and around the commutator. This mold has at the level of the groove 3a of the commutator an annular projection 12a, adjacent to a bearing part 2a of the inner bushing 2 there is a further annular projection 12b, and radially the projections 12a–12b are connected by small bars or tenons 12c.

The molding resin 13 is inserted within the space which is left free between the lower mold 10, the socket 2, the upper mold 12 and the commutator 3. When the upper mold 12 is removed, the resin of this first molding has the recessed complementary shapes or grooves to the projections 12a–12b and the tenons 12c.

Prior to making with the molds 19-20 the second molding the main purpose of which is encasing the windings or coils 5 connected to the commutator and putting finally the rotor into shape, a metal piece 14 is placed against the first molding, said metal piece including for this purpose a fitting bearing part 14a clamped on the bearing part 2a of the socket, followed by a tapered bearing part 14b for covering and sealing the recessed shapes which are complementary to the tenons 12c of the resin, an end collar 14c being then positioned so as to rest against a recess 13a of the resin (FIG. 8). Openings 14d are provided on the tapered bearing part 14b for a good bonding of the resin 15 of the second molding with the resin 13 of the first molding, these openings being of course positioned between the shapes complementary to the tenons 12c. A tube 14e stuck into the piece 14 and emerging externally to the resin 15 is provided for filling as previously the sealed heat transmitting device, thus formed, by the outer groove 16 (complementary to the projection 12a of the upper mold 12), the inner groove 17 (complementary to the projection 12b of the upper mold 12) and by the canals 18 (complementary to the tenons 12c of the upper mold 12).

The advantages are clearly apparent from the description.

The invention is not limited in any way to the details of use and of construction or design of its various parts which have been more particularly shown herein; on the contrary, all the alternative forms of embodiment are included within the scope of the invention.

I claim:

1. Rotor with commutator-cooling device for electric motors of the type comprising a molded unit having an inner bushing (2) on the driving shaft (6), a current commutator (3) and a winding (5) connected to the commutator (3), wherein cooling is effected by a thermal bridge established between said inner bushing (2) and said commutator (3) by at least one thermal conductor (1-C1-C2) embedded in the rotor, one part of which is positioned immediately adjacent to said commutator (3) but without contacting it, and the other part of which is in intimate contact with said inner bushing (2) in order to create a transfer of heat from said commutator to said inner bushing.

2. Rotor according to claim 1 wherein said thermal bridge between said commutator (3) and said inner bushing (2) is a metallic piece (1) which comprises an inner bearing surface (1a) mounted in intimate contact with said inner bushing (2); a wall (1b) basically perpendicular to said inner bearing surface (1a); and an outer bearing surface (1c) extending to the immediately adjacent to said commutator without contacting it, whereby as least one orifice (1d) is provided in said wall (1b) to assure the continuity of molding the rotor.

3. Rotor according to claim 2, characterized in that said metallic piece (1) is electrically insulated from said commutator (3) by a means immediately adjacent to said commutator (3).

4. Rotor according to claim 2, characterized in that said metallic piece (1) has a raised edge (1e) at the end of said outer bearing surface (1c) for reinforcing said commutator (3) and strengthing said metallic piece (1).

5. Rotor according to claim 1, characterized in that the themal bridge between said commutator (3) and said inner bushing (2) comprises an inner conduit (7) in intimate contact with said bushing (2), an outer conduit (8) positioned immediately adjacent to said commutator (3) but without contacting it, and radial tubes (9) communicating with said conduits (7) and (8); whereby said thermal bridge is tight and partially filled, before the circuit obtained is closed, by a fluid which is selected as a function of the operating temperatures of the rotor so that said fluid vaporizes when it is in said outer conduit (8) and liquefies when said fluid is in said inner conduit (7), and whereby the centrifugal force created by the rotation of the motor constantly sweeps the liquid part of said fluid toward said commutator.

6. Rotor according to claim 1, characterized in that said thermal bridge between said commutator (3) and said inner bushing (2) comprises an inner groove and an outer groove formed in the rotor; at least one radial conduit (18) connecting said grooves, and by a metallic closing piece (14) having a filling tube (14e) and at least one combination orifice (14d) for the molded rotor, wherein said at least one orifice (14d) is located between said at least one radial conduit (18).

7. Rotor according to claim 6, characterized in that said metallic closing piece (14) has a bearing surface (14a) in intimate contact with said inner bushing (2), a conical bearing surface (14b) for closing said at least one radial conduit (18), having said at least one with orifice (14d), and an end collar (14c) which is supported on a recess (13a) of the molded rotor immediately adjacent to said commutator (3) but without contacting it.

* * * * *